US008550362B2

(12) United States Patent
Cowcher

(10) Patent No.: US 8,550,362 B2
(45) Date of Patent: Oct. 8, 2013

(54) PROCESSOR CARD ARRANGEMENT

(75) Inventor: Paul Randle Cowcher, Edinburgh (GB)

(73) Assignee: The Royal Bank of Scotland plc (GB)

( * ) Notice: Subject to any disclaimer, the term of this patent is extended or adjusted under 35 U.S.C. 154(b) by 0 days.

(21) Appl. No.: 12/893,781

(22) Filed: Sep. 29, 2010
(Under 37 CFR 1.47)

(65) Prior Publication Data
US 2011/0062242 A1    Mar. 17, 2011

Related U.S. Application Data

(63) Continuation of application No. PCT/EP2009/053753, filed on Mar. 30, 2009.

(30) Foreign Application Priority Data

Mar. 31, 2008    (GB) .................................. 0805780.4

(51) Int. Cl.
| | | |
|---|---|---|
| G06K 19/00 | (2006.01) | |
| G06K 19/06 | (2006.01) | |
| G06K 5/00 | (2006.01) | |
| G06Q 40/00 | (2012.01) | |
| G07D 11/00 | (2006.01) | |
| G07F 19/00 | (2006.01) | |
| G06F 7/08 | (2006.01) | |

(52) U.S. Cl.
USPC ........... 235/492; 235/379; 235/380; 235/381; 235/487; 235/493

(58) Field of Classification Search
USPC .................. 235/487, 492, 493, 379, 380, 381
See application file for complete search history.

(56) References Cited

U.S. PATENT DOCUMENTS

| | | | | | |
|---|---|---|---|---|---|
| 4,766,293 | A | * | 8/1988 | Boston | 705/41 |
| 4,789,776 | A | * | 12/1988 | Inoue | 235/492 |
| 4,849,617 | A | * | 7/1989 | Ueda | 235/492 |
| 4,959,788 | A | * | 9/1990 | Nagata et al. | 705/41 |
| 5,585,787 | A | * | 12/1996 | Wallerstein | 340/5.42 |

(Continued)

FOREIGN PATENT DOCUMENTS

| | | |
|---|---|---|
| EP | 0 735 505 A2 | 10/1996 |
| GB | 2 427 047 A | 12/2006 |

(Continued)

OTHER PUBLICATIONS

PCT International Search Report Dated Aug. 4, 2009 issued by the International Searching Authority in a related International Application No. PCT/EP2009/053753 (3 pages).

(Continued)

*Primary Examiner* — Daniel Walsh
(74) *Attorney, Agent, or Firm* — DLA Piper LLP (US)

(57) ABSTRACT

Disclosed is a processor card arrangement comprising a first portion and a second portion capable of being moved relative to one another between a first configuration and a second configuration resulting in the processor card switching between a first state and a second state, wherein when in said first state, the processor card arrangement is operable to perform at least one function and, when in said second state, the processor card arrangement it is not operable to perform said at least one function. According to some embodiments of the invention the dimensions of said processor card arrangement are substantially the same when in the first configuration and when in the second configuration.

22 Claims, 13 Drawing Sheets

(56) References Cited

U.S. PATENT DOCUMENTS

| | | | |
|---|---|---|---|
| 5,590,038 A * | 12/1996 | Pitroda | 705/41 |
| 6,011,858 A * | 1/2000 | Stock et al. | 382/115 |
| 6,064,988 A * | 5/2000 | Thomas | 705/44 |
| 6,407,940 B1 * | 6/2002 | Aizawa | 365/52 |
| 6,832,730 B2 * | 12/2004 | Conner et al. | 235/487 |
| 7,090,124 B2 * | 8/2006 | Wallace et al. | 235/380 |
| 7,152,801 B2 * | 12/2006 | Cuellar et al. | 235/492 |
| 7,213,749 B2 * | 5/2007 | Webb et al. | 235/380 |
| 7,218,528 B2 * | 5/2007 | Chen | 361/737 |
| 7,328,844 B2 * | 2/2008 | Workens | 235/451 |
| 7,364,090 B2 * | 4/2008 | Cuellar et al. | 235/492 |
| 7,367,503 B2 * | 5/2008 | Harai et al. | 235/441 |
| 7,866,550 B2 * | 1/2011 | Clegg et al. | 235/380 |
| 7,988,061 B2 * | 8/2011 | Cook et al. | 235/493 |
| 8,013,332 B2 * | 9/2011 | Middlekauff et al. | 257/48 |
| 2001/0051923 A1 * | 12/2001 | Kosuda | 705/43 |
| 2002/0023963 A1 * | 2/2002 | Luu | 235/492 |
| 2002/0065001 A1 * | 5/2002 | Sun | 439/630 |
| 2003/0014891 A1 * | 1/2003 | Nelms et al. | 40/649 |
| 2003/0024995 A1 * | 2/2003 | Conner et al. | 235/492 |
| 2003/0085454 A1 * | 5/2003 | Reutner et al. | 257/679 |
| 2003/0106935 A1 * | 6/2003 | Burchette, Jr. | 235/380 |
| 2003/0111527 A1 * | 6/2003 | Blossom | 235/380 |
| 2003/0200445 A1 * | 10/2003 | Park | 713/185 |
| 2004/0089724 A1 * | 5/2004 | Lasch et al. | 235/487 |
| 2004/0124246 A1 * | 7/2004 | Allen et al. | 235/492 |
| 2005/0009503 A1 * | 1/2005 | Bourke et al. | 455/411 |
| 2005/0125343 A1 * | 6/2005 | Mendelovich | 705/39 |
| 2005/0194450 A1 * | 9/2005 | Webb et al. | 235/487 |
| 2005/0205665 A1 * | 9/2005 | Lasch et al. | 235/380 |
| 2005/0230484 A1 * | 10/2005 | Cuellar et al. | 235/492 |
| 2005/0258243 A1 * | 11/2005 | Hsieh | 235/441 |
| 2006/0000894 A1 * | 1/2006 | Bonalle et al. | 235/380 |
| 2006/0017570 A1 * | 1/2006 | Moskowitz et al. | 340/572.7 |
| 2006/0139901 A1 * | 6/2006 | Meireles et al. | 361/760 |
| 2006/0187060 A1 | 8/2006 | Colby | |
| 2006/0208091 A1 * | 9/2006 | Nishizawa et al. | 235/492 |
| 2006/0232950 A1 * | 10/2006 | Miyawaki et al. | 361/796 |
| 2006/0261454 A1 * | 11/2006 | Takiar et al. | 257/678 |
| 2006/0287004 A1 * | 12/2006 | Fuqua | 455/558 |
| 2007/0045417 A1 * | 3/2007 | Tsai et al. | 235/441 |
| 2007/0060200 A1 * | 3/2007 | Boris et al. | 455/558 |
| 2007/0190861 A1 * | 8/2007 | Webb et al. | 439/630 |
| 2007/0252010 A1 * | 11/2007 | Gonzalez et al. | 235/492 |
| 2007/0267505 A1 * | 11/2007 | Chen | 235/492 |
| 2007/0271467 A1 * | 11/2007 | Ayala et al. | 713/185 |
| 2007/0290858 A1 * | 12/2007 | Janke et al. | 340/572.7 |
| 2008/0000987 A1 * | 1/2008 | Augustinowicz et al. | 235/492 |
| 2008/0011830 A1 * | 1/2008 | Bonalle et al. | 235/380 |
| 2008/0059793 A1 * | 3/2008 | Lord et al. | 713/156 |
| 2008/0087731 A1 * | 4/2008 | Gonzalez et al. | 235/441 |
| 2008/0099556 A1 * | 5/2008 | Park | 235/382.5 |
| 2008/0156885 A1 * | 7/2008 | Landau et al. | 235/492 |
| 2008/0191033 A1 * | 8/2008 | Cuellar et al. | 235/492 |
| 2008/0257966 A1 * | 10/2008 | Britt et al. | 235/492 |
| 2009/0045257 A1 * | 2/2009 | Maus | 235/382 |
| 2009/0050693 A1 * | 2/2009 | Clegg et al. | 235/380 |
| 2009/0134218 A1 * | 5/2009 | Yuzon et al. | 235/382 |
| 2009/0140042 A1 * | 6/2009 | Clegg | 235/380 |
| 2009/0240625 A1 * | 9/2009 | Faith et al. | 705/65 |
| 2010/0072284 A1 * | 3/2010 | Nishizawa et al. | 235/492 |
| 2010/0142161 A1 * | 6/2010 | Garnier | 361/749 |
| 2010/0222014 A1 * | 9/2010 | Philipsson | 455/91 |

FOREIGN PATENT DOCUMENTS

| | | |
|---|---|---|
| JP | 2007140776 A | 6/2007 |
| WO | WO 2005/045754 A1 | 5/2005 |
| WO | WO 2007/021862 A2 | 2/2007 |
| WO | WO 2007/149101 | 12/2007 |

OTHER PUBLICATIONS

PCT Written Opinion of the International Searching Authority Dated Aug. 4, 2009 in a related International Application No. PCT/EP2009/053753 (6 pages).

Communication (Search Report under Section 17(5)) dated Jul. 28, 2008 issued by the UK Patent Office in related UK Application GB 0805780.4 (4 pages).

* cited by examiner

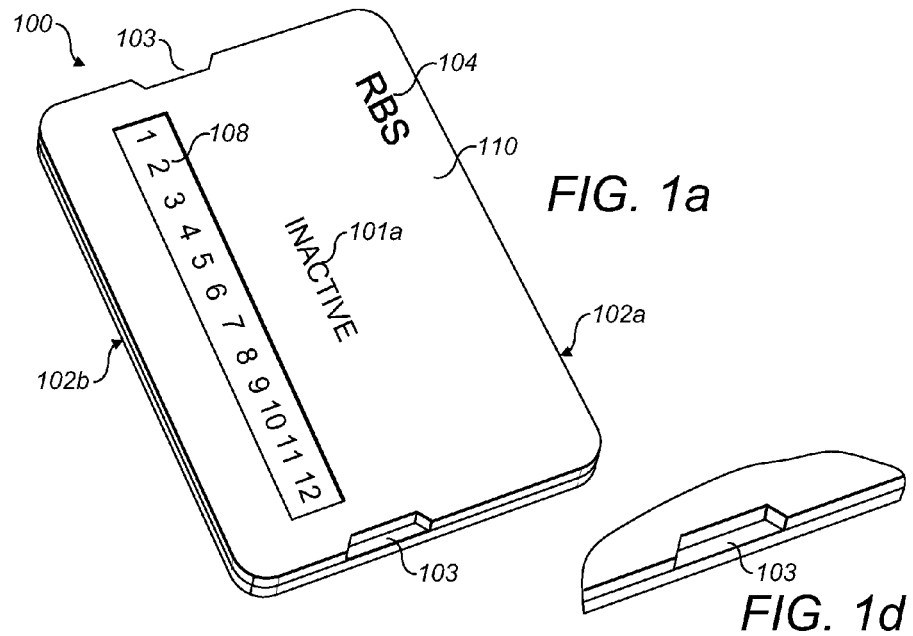
FIG. 1a
FIG. 1d
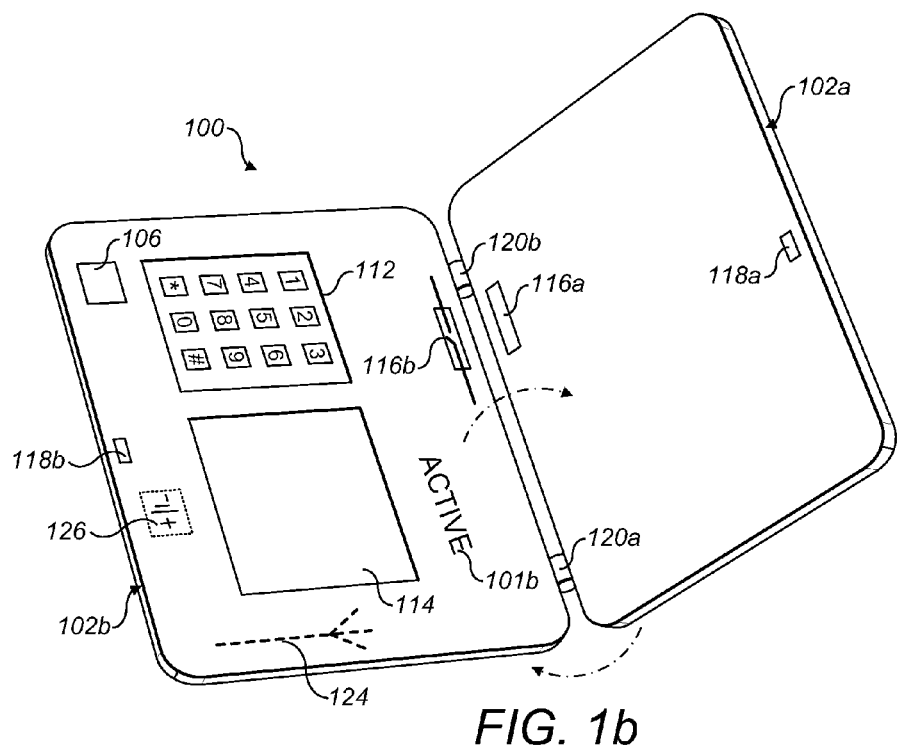
FIG. 1b

PROCESSOR CARD ARRANGEMENT

CROSS-REFERENCE TO RELATED APPLICATION

This is a continuation application of PCT International Application No. PCT/EP2009/053753 filed Mar. 30, 2009, which claims priority of the British Application No. 0805780.4 filed Mar. 31, 2008, the entire disclosure of each of which is incorporated herein by reference.

FIELD OF THE INVENTION

The present invention relates to a processor card arrangement. In particular, the invention relates to a processor card arrangement which is capable of being arranged in more than one configuration.

BACKGROUND OF THE INVENTION

Processor cards containing a data processing capability such as a microprocessor can be used as credit cards, debit cards, stored-value cards, membership cards, security access cards, identification cards and so on. Cards having a data processing capability are sometimes referred to as "smartcards". Such cards are usually of a standardised size and shape, such as that prescribed in ISO 7810 for credit cards and debit cards etc., and tend to have information such as an indication of the card issuer, a card holder name, a card number and so on displayed in standard areas on the card surface on one side of the card. The opposing side of the card may comprise a magnetic or optical stripe and an area for the signature of a user of the processor card holder possibly contact details and other relevant party logos.

It is now possible to incorporate more and more functions within such cards. For example, it is now possible to incorporate dynamic displays in cards using, for example LCD or 8-segment displays; audio transmitters may also be incorporated using, for example, flat panel loudspeaker technology such as that produced by NXT™. However, incorporation of sophisticated functions, which may necessitate a user input interface, is inhibited by the limited available space on such cards due to the standardised size and the space taken up by information such as that described above.

Using processor cards to process transactions may involve entering the card into a reading terminal, which then reads information from the magnetic or optical strip and/or processor chip (via an array of contact pads on the front face of the card). The user inputs an identification code known only to the user such as a Personal Identification Number (PIN) into the terminal. The terminal and card interact to verify that the identification code matches a value stored in the card, in a known manner; the transaction only proceeds if there is a match, which prevents the card being used by third parties in the event that the card is lost or stolen.

However, there is a move to arrange processor cards for use in performing contactless transactions, in which the card communicates wirelessly with a terminal using, for example, inductive or capacitive activation and Radio Frequency Identification (RFID) technology; this may be implemented using, for example, EMV Contactless Communication Protocol Specification v.2.0. This allows transactions to be processed more quickly than methods involving entering an identification code, but gives rise to security issues; since the information on the card can be read wirelessly, it is possible that third parties could use portable terminals to read this information without the user's knowledge and subsequently make use of this information for nefarious purposes.

In some arrangements processor cards are used in conjunction with another device, such as a mobile telephone. A card may be inserted into the device, which then accesses data on the card and communicates wirelessly with a terminal using, for example, Near Field Communication (NFC) technology.

SUMMARY OF THE INVENTION

In accordance with the present invention, there is provided a processor card arrangement comprising a first portion and a second portion capable of being moved relative to one another between a first configuration and a second configuration resulting in the processor card switching between a first state and a second state, wherein:

when in said first state, the processor card arrangement is operable to perform at least one function; and when in said second state, the processor card arrangement it is not operable to perform said at least one function.

Thus, processor card arrangements according to the present invention may adopt more than one configuration, with the range of functions that the card is operable to perform varying according to the configuration. This enables the limited physical size of such processor cards to be used more efficiently than in conventional cards having only a single configuration. Since a change in state of the card is caused by a change in configuration, the user can easily discern the current state of the card.

The at least one function may comprise communicating with a remote device. Thus, processor card arrangements according to the present invention may be used to perform contactless transactions. In this case, the card may be operable to perform the transaction when in one configuration, but not when in another, allowing the card, when not in use, to be kept in a state in which it is not capable of contactless communication, preventing acquisition by unauthorised parties of information stored on the card. The contactless transaction capability may be instead of or in addition to the more traditional 'contact' transaction capability via an array of contact pads (in other words a processor card may have an array of contact pads and a contactless transaction capability).

Alternatively, or additionally, the at least one function may comprise a display function of the card. Varying the card display according to configuration allows more variety of information to be displayed than in arrangements which have only a single configuration.

In some embodiments, the surface area of the arrangement is substantially the same when in the first configuration as when in the second configuration. This allows the card to be used to perform different functions whilst maintaining a size prescribed for the card.

In some embodiments, the appearance of the arrangement when in the first configuration is substantially different to the appearance when in the second configuration. Alternatively, or additionally, the texture of at least a part of the arrangement when in the first configuration may be substantially different to the texture when in the second configuration. These features allow a user of the card to easily discern a current configuration, and thereby state, of the arrangement.

In some embodiments, the first and second portions are connected by a hinge which facilitates said movement. Alternatively, or additionally, the portions may be connected by a swivel hinge which facilitates said movement. These features provide convenient means of connecting the portions, allowing the portions to be moved with respect to one another between configurations.

The processor card arrangement may comprise a switch which is activated by said movement. The switch may comprise a reed switch or it could be a mechanical switch. These features provide convenient means of implementing switching between states. In some embodiments, moving the arrangement between a first configuration and a second configuration comprises at least one of the following actions: lifting at least one of said first portion and second portion; sliding at least one of said first portion and second portion; rotating at least one of said first portion and second portion. These features provide convenient means for changing configurations.

In some embodiments each of said first portion and said second portion comprises a laminar portion arranged so that, in said second configuration, a first face of said first portion opposes a first face of said second portion and said first portion overlaps said second portion. In the first configuration, a second face of said first portion may oppose a second face of said second portion and a second portion may overlap said first portion. This provides an arrangement in which one portion may be "flipped over" another portion, such that it finishes on the opposite side of the other portion to which it started.

In some embodiments, when in the first configuration, the second portion is offset with respect to the first portion. In some cases it may be convenient to provide an arrangement in which the portions are slid apart in order to change the state of the card.

In some embodiments, movement between the first configuration and the second configuration comprises a lifting action and a rotating action, such that, in the first configuration, a first face of said first portion is exposed, and, in the second configuration, a second face of said first portion is exposed.

Movement from the first configuration to the second configuration may expose a first display element. Movement from the second configuration to the first configuration may expose a second display element. These features allow different displays to be used in different configurations, allowing the arrangement to provide a greater total display area than is possible in conventional cards of the same size.

At least one of the first display element and the second display element may comprise an LCD display element. Additionally, or alternatively, at least one of the first display element and said second display element may comprise an electronic ink display element. These features provide convenient means for implementing the display.

In some embodiments, movement from the first configuration to the second configuration exposes a first input means. Additionally, or alternatively, movement from the second configuration to the first configuration may expose a second input means. At least one of said first input means and said second input means may comprise a key pad. These features allow different inputs to be used in different configurations, allowing the arrangement to provide more input means than is possible in conventional cards of standardised size.

The processor card arrangement may be arranged to be lockable in at least one of said first configuration and said second configuration. The arrangement may comprise at least one of a magnetic locking means and a mechanical locking means. The features allow the card to be kept in a configuration without slipping into another configuration; this prevents, for example, the arrangement accidentally slipping into a configuration in which it may be read surreptitiously by third parties.

In some cases, the processor card arrangement comprises a third portion which is capable of being moved with respect to at least one of the first portion and the second portion. The invention is not limited to processor card arrangements having only two portions.

In some embodiments, the arrangement comprises a transaction card. The invention may have particular utility with cards used for performing financial or other transactions, such as credit cards, debit cards, stored value cards, and so on.

The arrangement may be operable for use in a transaction involving a first user account when in said first state, and said arrangement is operable for use in a transaction involving a second user account when in said second state. Thus the card may be switched between states in which it is can be used to, for example make a purchase, funds for which are withdrawn from different accounts of a user, or of more than one user.

In some embodiments, the arrangement is operable to perform a function of a first type of transaction card when in said first state, and said arrangement is operable to perform a function of a second type of transaction card when in said second state. Thus the card may be switched between states in which it is alternately operable to act as first type of transaction card, e.g. a debit card, and a second type of transaction card, e.g. a credit card.

In at least one configuration, the processor card arrangement may have dimensions complying with ISO 7810. This allows the card to be used with conventional equipment, such as an ATM.

BRIEF DESCRIPTION OF THE DRAWINGS

Further features and advantages of the invention will become apparent from the following description of embodiments of the invention, given by way of example only, which makes reference to the accompanying drawings, of which:

FIG. 1a is a schematic diagram of a first processor card arrangement in a first configuration according to an embodiment of the present invention;

FIG. 1b is a schematic diagram of the first processor card arrangement in an intermediate stage between the first configuration and a second configuration;

FIG. 1d is a schematic diagram of a notch for facilitating separating portions of the first processor card arrangement;

DETAILED DESCRIPTION OF THE INVENTION

In the following discussion we will be describing examples of processor cards capable of being arranged in two or more configurations in accordance with embodiments of the present invention. Examples will be described in which the processor card is a transaction card such as a credit card, debit card or stored value card, but it is to be understood that the present invention is not limited to such cards; indeed, the present invention is applicable to any type of card containing a processing functionality, including cards which are not used for transactions, such as identification cards, membership cards, memory cards and so on. The processor card may be a card whose audiovisual output is controlled by an external signal, for example a signal of a terminal, which updates the card, for example by changing a colour of the card, to indicate information, such as a new account status associated with the card, a state of a balance of an account associated with the card and so on.

Figure 1C:
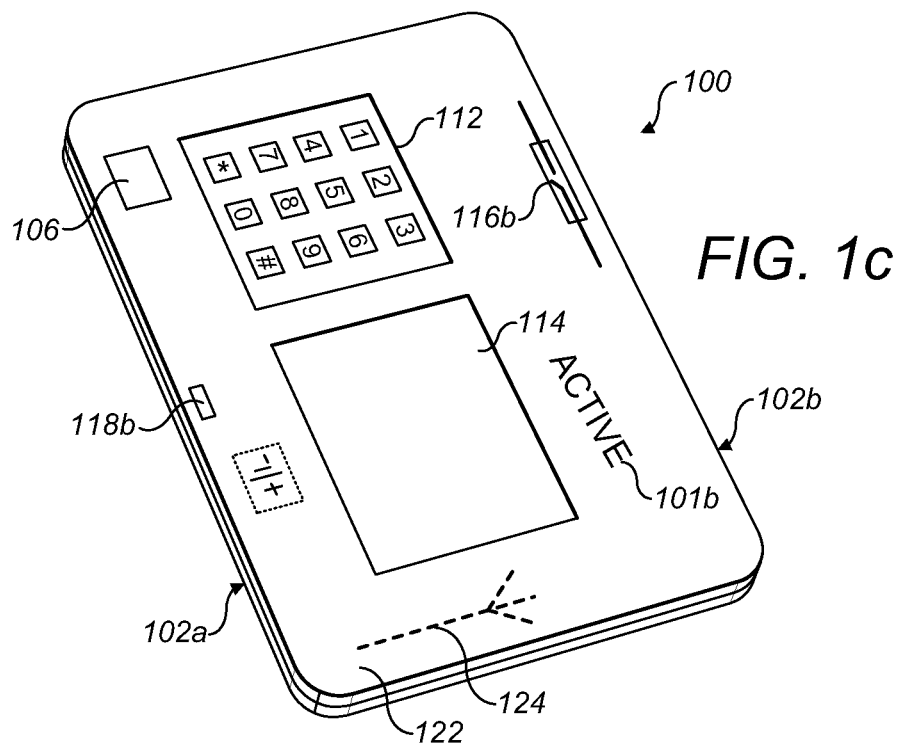
FIG. 1c is a schematic diagram of the first processor card arrangement in the second configuration.

FIG. 1a to FIG. 1d show a first example of a processor card arrangement 100 in accordance with an embodiment of the present invention. FIG. 1a shows a processor card arrangement 100 comprising a first portion 102a and a second portion 102b. Each of the first portion 102a and the second portion 102b are thin panel portions of substantially the same surface area, the first portion 102a overlapping the second portion 102b. In the configuration shown in FIG. 1a, a card issuer name 104 and a card number 108 are visible on a first surface 110 of the card 100. In this example, the processor card 100 is not capable of contactless communication with a terminal when in the configuration shown in FIG. 1a. Configurations in which a processor card arrangement 100 is not capable of contactless communication with a terminal are herein referred to as "inactive" configurations; configurations in which a card is capable of contactless communication with a terminal are referred to as "active" configurations. That the configuration of FIG. 1a is an inactive configuration is indicated by the marking "inactive" 101a on the surface 110 of the card arrangement 100.

We now turn to describing the card being moved from an inactive configuration to an active configuration. The two portions 100a and 100b are connected by hinges 120a and 120b, about which the portions 100a and 100b can be rotated to open and close the card arrangement 100. FIG. 1b shows an intermediate position between the first and second configurations, in which the first portion 102a has been rotated about the hinges 120a and 120b. In the active configuration, shown in FIG. 1c, the first portion 102a has been rotated through 360 degrees, so that it is positioned underneath the second portion 102b such that the second portion 102b overlaps the first portion 102a.

Movement from the active configuration to the inactive configuration exposes a further surface 122 of the card arrangement 100. On the further surface 122, there is provided a display area 114 and a keypad 112. The display area 114 may be used to display information such as: an available balance, which may be obtained through contactless communication with a terminal; personal details of the user such as a company ID, National ID number, NHS number or an alert code/message (e.g. allergic to penicillin); a balance remaining in an electronic purse; the number or value of transport 'credits' remaining; an authentication code or response to a challenge supplied by an input from an on-card or attached keyboard; a response to a challenge supplied through contact or wirelessly from a terminal; a ticket or event code (for transport, sports and social events) in numerical, 2-D or 3D bar code; lesser used functions such as NUS/student number, council number, DVLA or season ticket numbers or codes.

The display area 114 may comprise liquid crystal display (LCD) technology. LCD state changes may be driven by an array of drivers located towards or at the outer edges of the card arrangement 100, or by using a thin film matrix across the whole surface of the card to drive a matrix array of electro-optical 'ink' segments. The LCDs could be loaded with suitable crystal elements or liquids that have the ability to show at least two and preferably more colour sets or states. A matrix of Organic Light Emitting Diodes (OLEDs) could also function in a similar manner to a surface layer display across the surface of the card arrangement 100.

Alternatively, or additionally, the display area 114 may comprise electronic inks, whose output may be updated under the control of the processor chip 106. Updating of output from the card arrangement 100 may occur via electrical connections internal to the card arrangement 100 between processor chip 106 and display area 114. Such electronic (or electric ink) technology is currently being developed by companies such as Xerox™ and E Ink™

The keypad 112 may be used to interact with this data and/or used to perform functions such as entering a PIN number prior to performing a transaction, so that the identity of the user can be verified each time the card is used. Operation of the keypad 112 and the display area 114 is controlled, in this example, by a processor chip 106 located in the second portion 102b of the card 100. The second portion also includes an antenna 124, which is capable of transmitting data to and/or receiving data from a terminal when in the active configuration, and a battery 126 which provides power to the processor chip 106 and other components. The battery may be of a type that allows recharging at an updating terminal, or it may be able to sustain itself by self-charging via a mechanism such as a kinetic or photo-voltaic module embedded in the card, for example.

The card arrangement 100 includes a switching mechanism 116a, 116b which causes a transition between an inactive state, in which the card arrangement 100 is not operable to communicate with a terminal, and an active state in which the card arrangement 100 is operable to communicate with a terminal. In this example, this is achieved by a magnetic reed switch arrangement 116a, 116b, in which a magnetic element 116a is positioned on or near a surface of the first portion 102a which comes into contact with the surface 122 of the second portion 102b when in the inactive configuration, and a switch element 102b is located in a corresponding position on or near the surface 122 of the second portion 102b, such that the magnetic element 116a and the switch element 116b are in sufficiently close proximity that the switch element 116b is actuated by the magnetic element 116a when in the inactive configuration, but are not in sufficiently close proximity that the switch element 116b is actuated by the magnetic element 116a when in the active configuration. The magnetic element 116a could be printed magnetic ink.

Actuation of the switch element 116b may, for example, cause an electrical connection between the processor chip 106 and the antenna 124 to be broken, it may break a connection causing the battery 126 to cease to supply power to one or more components of the card arrangement 100 causing the card to become inactive, or it may cause, via, for example, logic circuitry, a signal to be sent to the processor chip 106 instructing the processor chip 106 that no communication with a terminal is to be made. Thus actuation of the switch element 116b by the magnetic element 116a causes the card to become inactive. It may also cause other components and/or functions such as the keypad 112 and the display area 114 to turn on or off; in the case of the present example card arrangement 100, actuation of the switch typically causes the keypad 112 and display area 114 to turn off in order to save battery 126 power, since these components cannot in any case be accessed in the inactive configuration.

In some arrangements, the elements of a reed switch arrangement may alternatively or additionally be located near opposite respective surfaces of the first portion 102a and the second portion 102b, this reed switch being activated by the card being moved into the active configuration rather than the inactive configuration.

In some arrangements, the switching mechanism is located in one or more of the hinges 120a, 120b. In this case, the switching mechanism may comprise one or more mechanical rotary micro-switches (sometimes known as barrel switches) where a connection is made (or broken) at a predetermined angle or rotation; for example, a connection may be made, so that the arrangement 100 is active, once the first portion 102a has been rotated through 180 degrees with respect to the second portion 102b from the active configuration shown in FIG. 1a, and broken at smaller angles of rotation, so that the arrangement 100 is inactive. Thus, when a user is not using the card for a contactless transaction, he or she may keep the card 100 in the inactive configuration shown in FIG. 1a. The card arrangement 100 may comprise a magnetic or optical strip (not shown), so that it may be used for non-contactless processing of transactions by insertion into a card reading device, for example. When the user wishes to use the card for a contactless transaction, or wishes to use the keypad 112 and/or display area 114, he or she may manipulate it into the active configuration for this purpose. This may be facilitated by one or more notches 103, an example of which is shown in detail in FIG. 1d, which facilitate a user separating the first portion 102a and the second portion 102b. Additionally, or alternatively, one or more portions 102a, 102b of the card 100 may include a protrusion or set of protrusions.

The different appearances of the card arrangement 100 in each of the configurations of FIG. 1a and FIG. 1c allow the user to easily discern whether the card is in an active state or an inactive state. In the present example, the indications "inactive" 101a and "active" 101b facilitate this discernment; in some examples, different colours may be used in different configurations. Additionally, or alternatively, the card may be arranged such that it has a different texture in one configuration to that in another, for example by using rougher material on one or more of the surfaces exposed in one configuration to that used on a corresponding surfaces exposed in the other configuration.

Although the card 100a has a different appearance in each of the configurations of FIG. 1a and FIG. 1c, it maintains essentially the same size and shape in each configuration, such that it may conform to a standard size and shape in each configuration.

The example processor card arrangement of FIG. 1a to FIG. 1d is also equipped with a locking mechanism 118a, 118b that prevents the card arrangement 100 from accidentally opening from the inactive configuration. The locking mechanism 118a, 118b may comprise a magnetic element 118a and a ferromagnetic metal element 118b located at corresponding positions on the first portion 102a and second portion 102b, so that mutual magnetic attraction between these elements compels the two portions 102a, 102b together until forced apart by a user.

Although not show, a further locking arrangement is typically used to prevent the card arrangement 100 from slipping out of the active configuration. Although in this example, a magnetic locking mechanism is used, in some arrangements the locking mechanism may be mechanical, for example a catch and release mechanism.

In the exemplary arrangement 100 described in relation to FIG. 1a to FIG. 1c, the processor card arrangement 100 was switched between two configurations. However, in some arrangements, in addition to the states already described, the processor card arrangement could be switched into a further state when the first portion 102a is at an angle of 90 degrees to the second portion 102b, another further state when the first portion 102a is at an angle of 180 degrees to the second portion 102b, and so on. It could be arranged so that the display area 114 displays different information depending on the angle, for example.

Figure 1E:
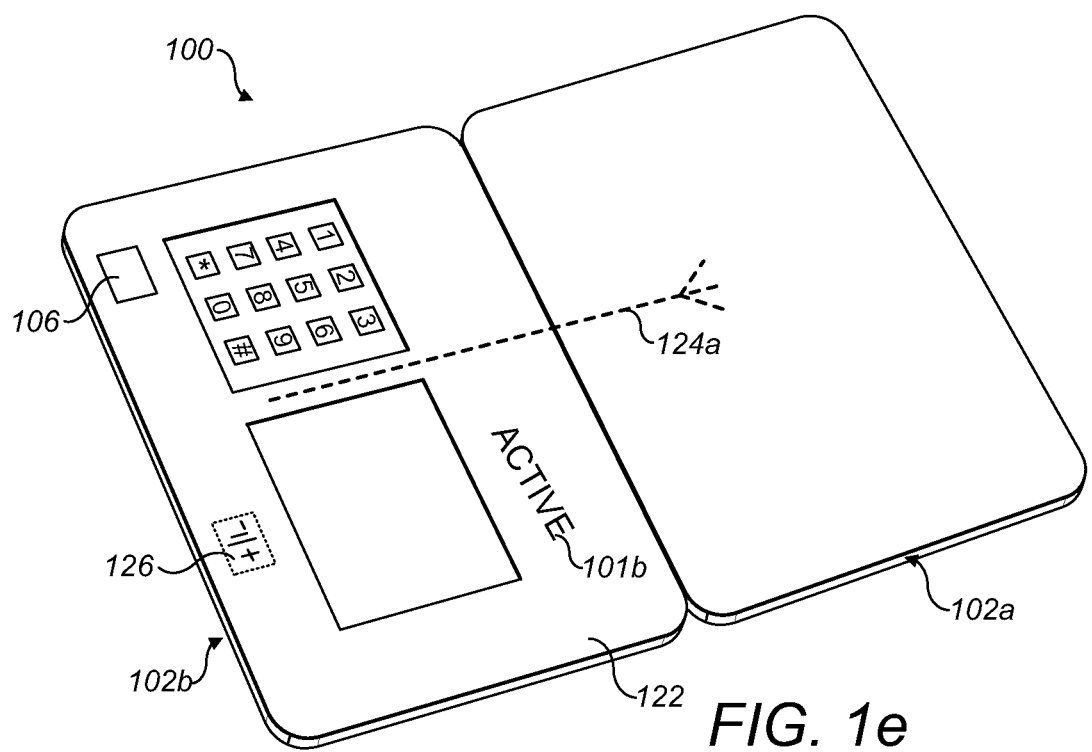
FIG. 1e is a schematic diagram of the first processor card arrangement in a third configuration.

An example configuration in which the first portion 102a has been rotated 180 degrees with respect to the second portion from the configuration of FIG. 1a is shown in FIG. 1e. Since the surface area of the arrangement 100 in this configuration is larger than in the configuration of FIG. 1a or FIG. 1c, it is possible to implement a large antenna 124a which is larger than is viable in conventional processor cards in which the size of the antenna is limited by the limited size of the card and further inhibited by required embossed areas and other components of the card. This large antenna 124a may span the first portion 102a and the second portion 102b as is shown in the example of FIG. 1e, or it may be located entirely in a single portion. A connection between the large antenna 124a and the processor 106 may be switched on/off by a switching mechanism as described above.

In some cases, the card arrangement 100 includes the large antenna 124a in addition to the antenna 124a; in some cases, it is used instead of the antenna 124a.

The large antenna 124a could be used to allow a higher degree of aerial gain in a single defined band, to enable a different frequency band to be tuned to the processor chip or to enable high power or data transfer rates, such as when the display is being used, or when a battery or capacitor on the card is required to be charged, for example.

In some cases, the configuration of FIG. 1e is used to perform a security function, such as an identifying function. It could be arranged that the card is only capable of forming a certain type of wireless connection, for example capacitive linking, when in this configuration. Since capacitance linking typically can only be implemented when the card is very close to the terminal (typically within 0.5 cm), and since a user is very unlikely to inadvertently leave the card in an "open" configuration such as that of FIG. 1e, unauthorised access is further prevented.

Figure 2A:
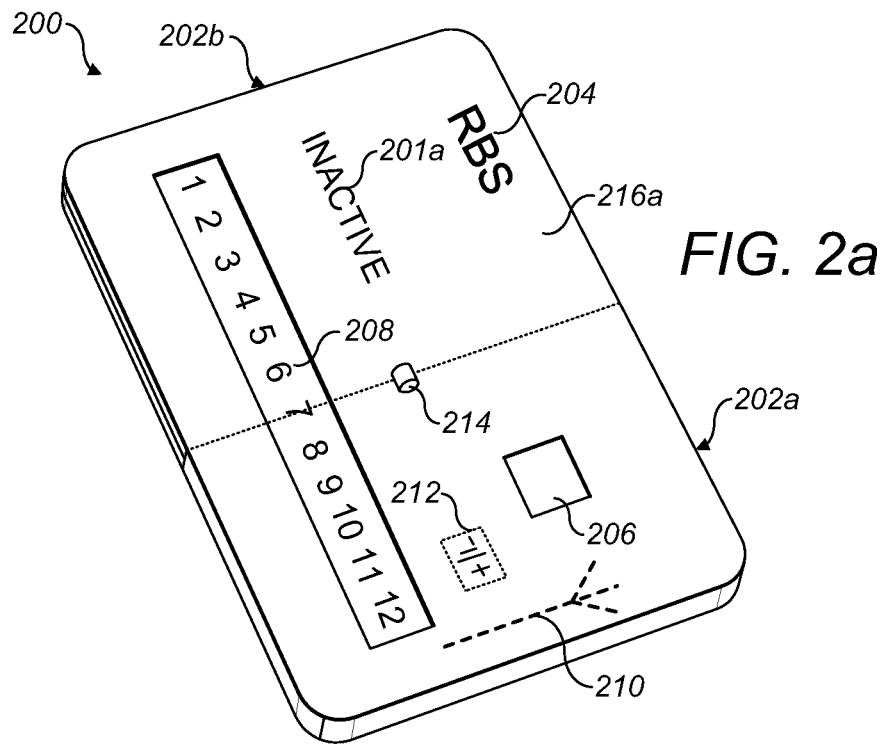
FIG. 2a is a schematic diagram of a second processor card arrangement in a first configuration according to an embodiment of the present invention.

An alternative processor card arrangement 200 in accordance with an embodiment of the present invention is now described with reference to FIG. 2a to FIG. 2e. FIG. 2a shows a processor card arrangement 200 in an inactive configuration. The card arrangement 200 comprises a first portion 202a and a second portion 202b, an antenna 210, a battery 212 and a processor chip 206 for, inter alia, controlling contactless communication with a terminal via the antenna 210. The second portion 202b is an approximately rectangular section contributing approximately half the total surface area of one exposed surface of the card, and having a thickness approximately half the total thickness of the card; the first portion 202a comprises the remainder of the card. The second portion 202b is connected to the first portion 202a by a swivel hinge 214, which allows the second portion 202b to be rotated about two perpendicular axes, as is described below. Swivel hinges are sometimes referred to as "universal joints".

In the inactive configuration of FIG. 2a, in which a first surface 216a of the second portion 202b is exposed, a card number 208, a card issuer name 204 and an indicator that the card is inactive 201a are all visible on an exposed surface of the card arrangement 200.

Figure 2B:
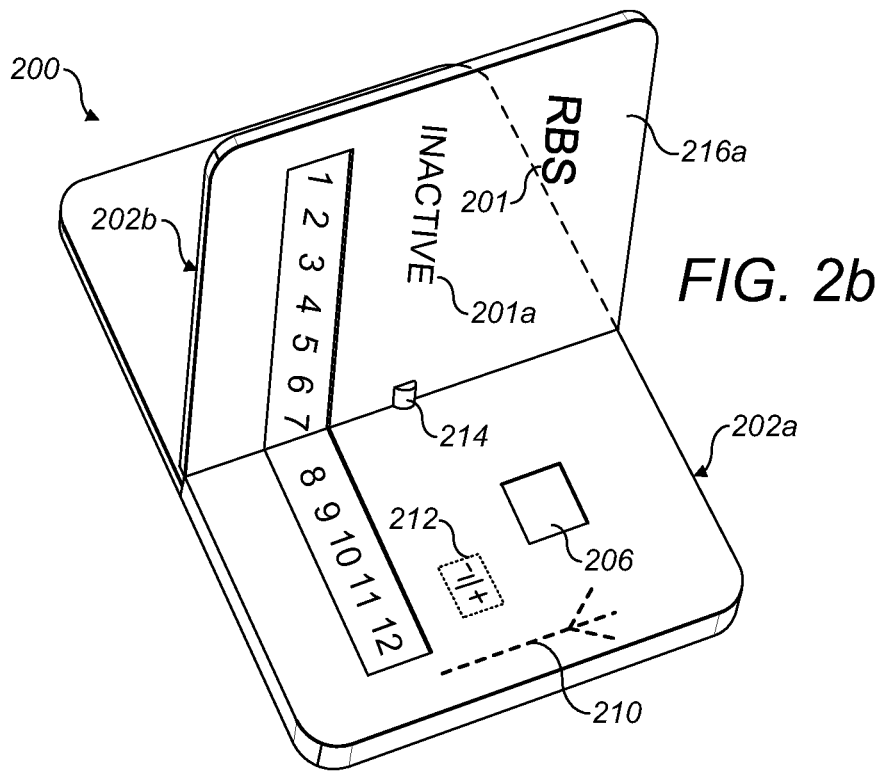
FIG. 2b is a schematic diagram of the second processor card arrangement showing one portion lifted.

We now turn to describing how the second portion 102b of the card arrangement 200 can be moved so that the card arrangement 200 switches between from an inactive state to an active state. Firstly, an end of the second portion 202b is lifted, so that the second portion 202b is disposed approximately perpendicular to the first portion 202a, as shown in FIG. 2b. This lifting action is typically performed by a finger of a user, and, although not shown, may be facilitated by a notch or notches similar to that described with reference to FIG. 1d.

Figure 2C:
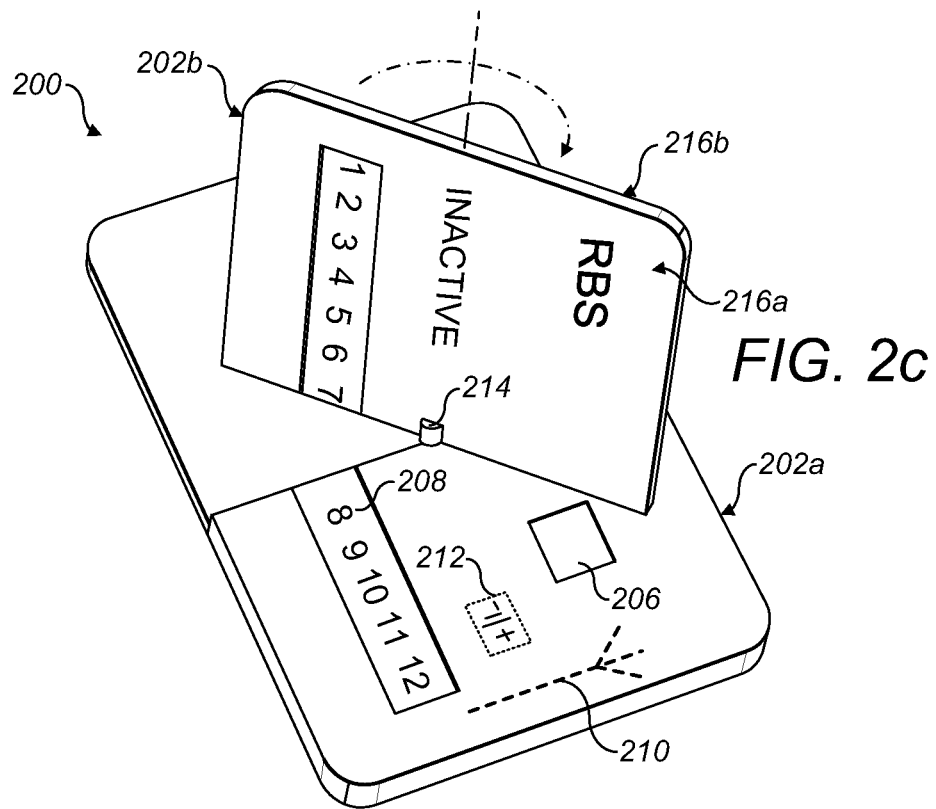
FIG. 2c is a schematic diagram of the second processor card arrangement with the lifted portion being rotated.
Figure 2D:
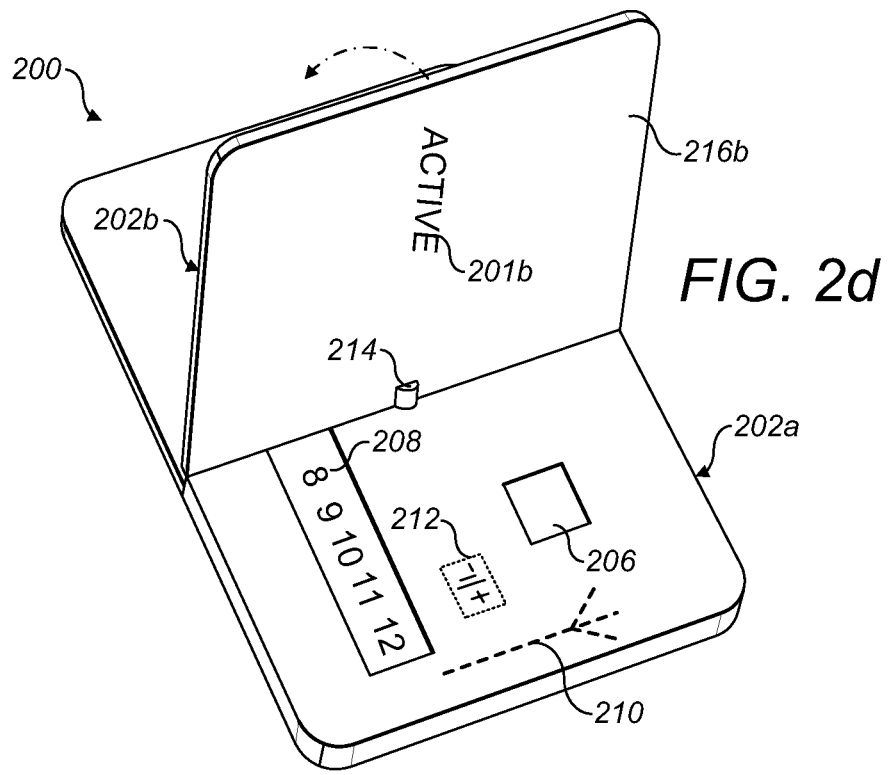
FIG. 2d is a schematic diagram of the second processor card arrangement with the lifted portion having been rotated through 180 degrees from its orientation in the first configuration.
Figure 2E:
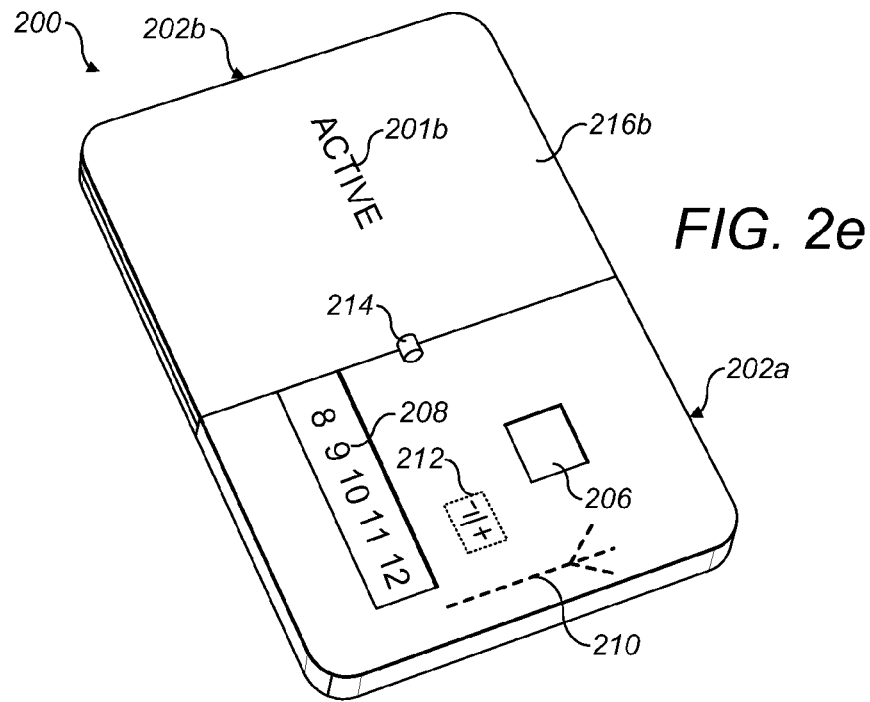
FIG. 2e is a schematic diagram of the second processor card arrangement in a second configuration.

Next the second portion 202b is rotated about an axis of the swivel hinge 214 through an angle of approximately 180 degrees, as shown in FIG. 2c and FIG. 2d. Finally, the second portion 202b is pushed back down into an active configuration as shown in FIG. 2e, so that it occupies the same position as in the inactive configuration of FIG. 2a, but rotated 180 degrees so that a second surface 216b of the second portion 202b is exposed. Differences between the appearance of the second surface 216b and the appearance of the first surface 216a cause the appearance of the card arrangement 200 in the active configuration to be significantly different to the appearance in the inactive configuration; in the active configuration, the card issuer name 204 is not visible, part of the card number 208 is obscured and the indicator "inactive" 201a has been replaced by an indicator "active" 201b. However, the card has essentially the same size and shape in each configuration, such that it may conform to a standard size and shape in each configuration.

As the card arrangement 200 is changed from the inactive configuration of FIG. 2a to the active configuration of FIG. 2e, it switches from an inactive state in which it is not operable to contactlessly communicate with a terminal to an active state in which it is operable to contactlessly communicate with a terminal. This switching can be achieved by any of the switching arrangements described above.

Although not shown in the Figures, magnetic or locking arrangements similar to those described above could be used to lock the card arrangement 200 in the inactive configuration of FIG. 2a and/or the active configuration or FIG. 2e.

Thus, the processor card arrangement described in relation to FIG. 2a to FIG. 2e provides a further example of a card arrangement 200 which may be conveniently switched between different states by a user. The card is typically kept in the inactive state when not in use (e.g. when stored in the user's wallet), so that information stored on it cannot easily be accessed by unauthorised third parties. When using the card for contactless transactions, the user manipulates the card into an active state. The differences in appearance between the inactive configuration and the active configuration enable the user to easily discern whether the card is in an active state or an inactive state, which helps to prevent the card from being carelessly left in an active state when not being used in a contactless transaction.

Figure 2F:
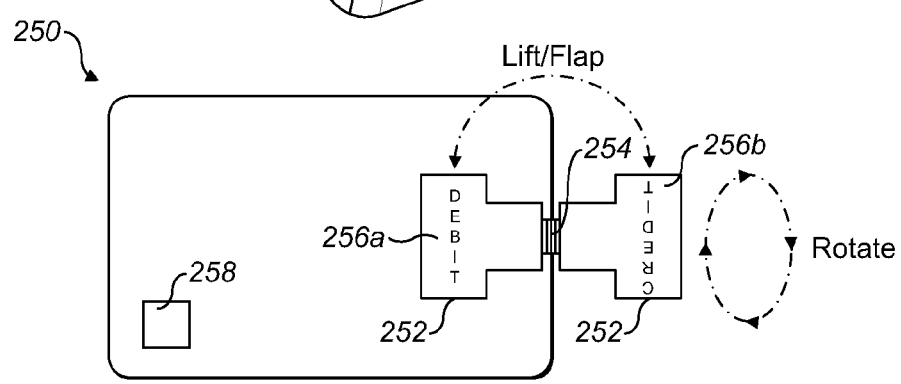
FIG. 2f is a simple schematic diagram of a third processor card arrangement according to an embodiment of the present invention.
Figure 2G:
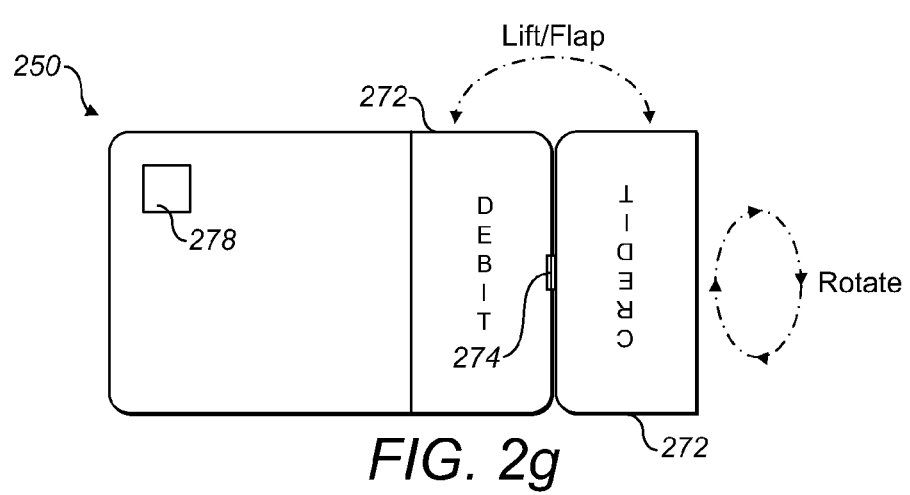
FIG. 2g is a simple schematic diagram of a fourth processor card arrangement according to an embodiment of the present invention.

FIG. 2f and FIG. 2g are simple diagrams of further card arrangements in which a portion is lifted, turned and replaced to switch between configurations and states. In FIG. 2f, a processor card arrangement 250 comprises a "T" shaped portion 252 connected to an edge of the card arrangement 250 by a swivel hinge arrangement 254. The processor card arrangement 250 comprises a processor chip 258. The swivel hinge arrangement 254 allows the card to be lifted, turned and replaced, thereby altering an exposed face of the portion and changing configurations. In this example, the arrangement has a credit card configuration, in which the card is in a state in which it is capable of functioning as a credit card, and a debit card configuration in which the card is in a state in which it is capable of functioning as a debit card. One face 256a of the "T" shaped portion indicates "debit", and another face 256b indicating "credit", enabling a user to discern a current state of the card. Either or both of the states may be an active state; either or both of the states may be an inactive configuration.

In FIG. 2g, a processor card arrangement 270 comprising a processor chip 279 includes a roughly rectangular portion 272 connected to an edge of the arrangement 270 by a swivel hinge arrangement 274, thereby allowing it to be lifted, turned and replaced to switch between configurations and states as with the "T" shaped arrangement described above in relation to FIG. 2f.

Although not shown in the simple diagrams of FIG. 2f and FIG. 2g, it will be appreciated that the card arrangements described with reference to these figures may comprise some or all of the components, such as an antenna or display or input means, of the arrangements described with reference to FIG. 2a to FIG. 2e, or any other arrangement described herein.

In each of the arrangements described in relation to FIG. 2a to FIG. 2g, it may be particularly advantageous for a texture of at least part of the card arrangement to vary according to configuration to provide an additional indication to the user of a state of the card.

Figure 3A:
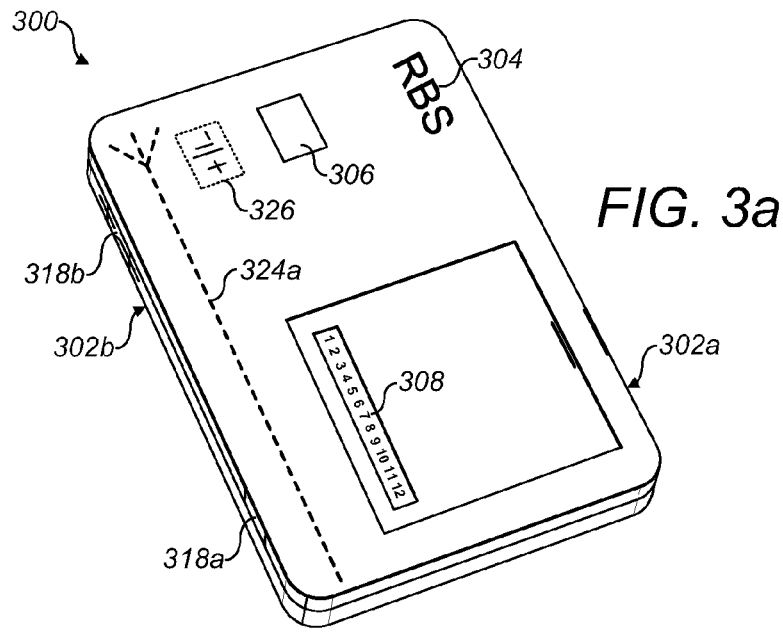
FIG. 3a is a schematic diagram of a fifth processor card arrangement in a first configuration according to an embodiment of the present invention.
Figure 3B:
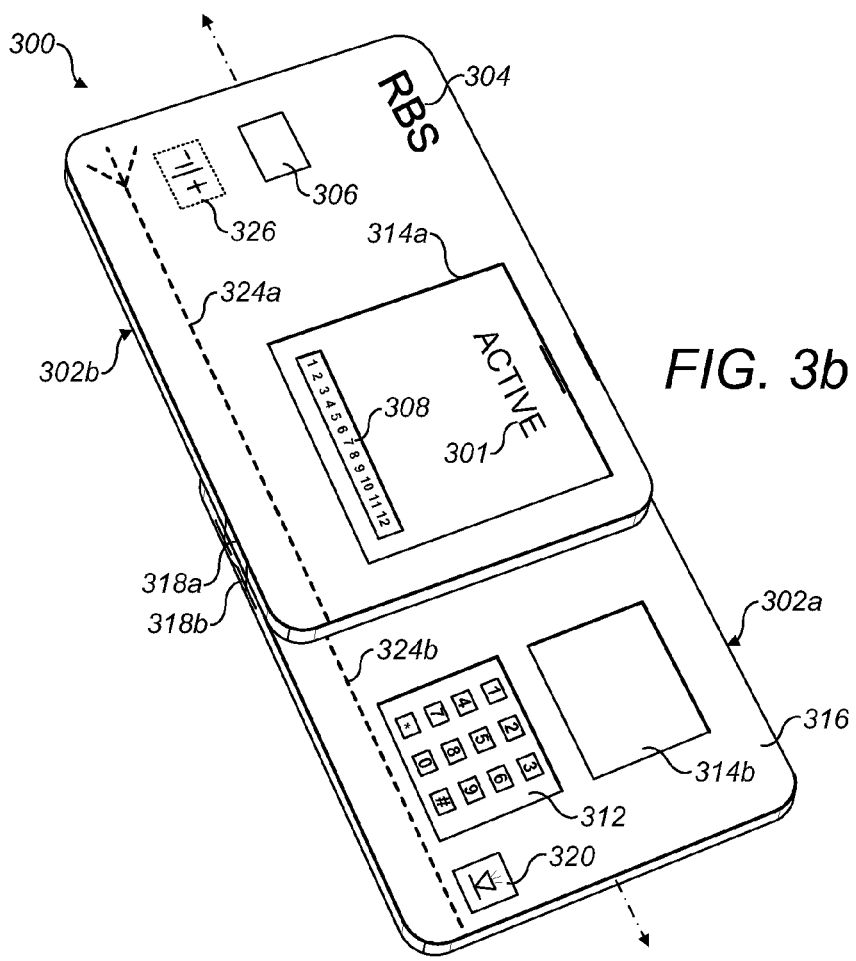
FIG. 3b is a schematic diagram of the fifth processor card arrangement in a second configuration.

Another processor card arrangement 300 in accordance with an embodiment of the present invention is now described in relation to FIG. 3a and FIG. 3b. FIG. 3a shows the processor card 300 in an inactive configuration. The card arrangement 300 comprises a first portion 302a and a second portion 302b. Each of the first portion 302a and the second portion 302b are thin and approximately rectangular portions of the substantially the same surface area, the first portion 302a overlapping the second portion 302b. In this configuration, a card issuer name 304, and a display area 314 are visible. In this example a card number 308 is displayed on the display area 314. The card also comprises a processor chip 306 and a battery 326.

FIG. 3b shows the processor card arrangement 300 in an active configuration in which the first portion and the second portion have been laterally displaced with respect one another, exposing a surface 316 of the first portion which is not visible in the inactive configuration. A further screen 314b, a keypad 312 and a speaker 320 are positioned on the exposed surface 316. An indicator "active" is displayed on the display area 314a, alerting the user that the card arrangement 300 is in an active state. Audio signals from the speaker 320 may be used to indicate that the card has been switched into an active state, and/or that the card has been in an active state for a predetermined length of time without being used to process a transaction, for example.

The switching between the inactive state and the active state may be achieved using a reed magnet arrangement 318a, 318b in which a magnetic element 318a is positioned such that it is moved into proximity with, and thereby activates, a switch element 318b when the card arrangement 300 is put into the active configuration, but is moved away from the switch element 318b when the card 300 is put into inactive configuration.

The different display areas 314a, 314b described in this processor card arrangement may be of different types. For example, the display area 314a in which a card number 308 is displayed may be touch-activated, and be capable of displaying information relating to personal details of the user; the other display may be controlled by the keypad 312 and may indicate information relevant to a contactless transaction, such as a monetary amount.

Figure 4A:
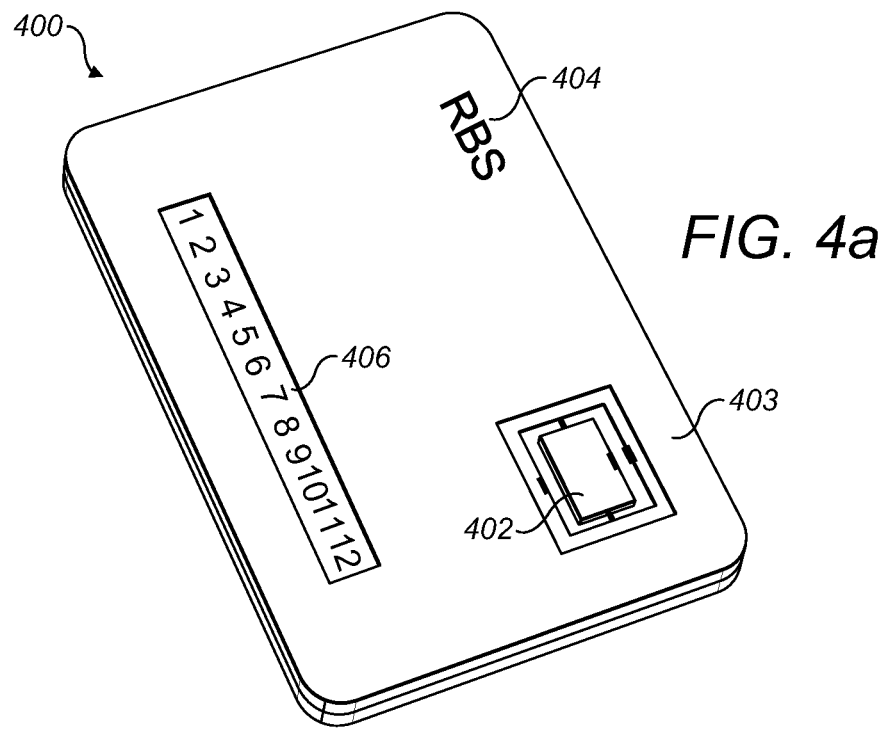
FIG. 4a is a schematic diagram of a sixth processor card arrangement according to an embodiment of the present invention.
Figures 4B, 4C:
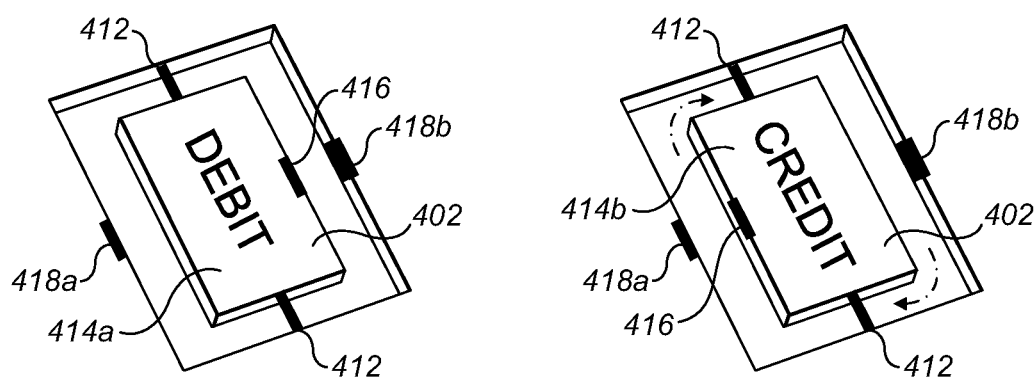
FIG. 4b is a schematic diagram of a portion of the sixth processor card arrangement in a first configuration.
FIG. 4c is a schematic diagram of the portion of the sixth processor card arrangement in a second configuration.

Another processor card arrangement 400 in accordance with an embodiment of the present invention is now described with reference to FIG. 4a to FIG. 4c. In this example, a processor card 400 can be arranged in two configurations, each of which is an inactive configuration. In a first configuration, which is referred to herein as a "debit card configuration", the card 400 is capable of acting as a debit card; in the second configuration, which is referred to herein as a "credit card configuration", the card 400 is capable of acting as a credit card. The card 400 may be inserted into a terminal for processing credit and/or debit card transactions, in which the terminal reads information via, for example, a magnetic or optical strip of the card (not shown).

The processor card arrangement 400 comprises a card issuer name 404, a card number 406, a switch portion 402 and a card portion 403, which comprises the portion of the card arrangement 400 not comprising the switch portion 402. The switch portion 402 is shown in greater details in FIG. 4b and FIG. 4c. The switch portion 402 is connected to the rest of the card by rotary spindles 412 which allow the element 402 to be rotated so that, in the debit card configuration shown in FIG. 4b, a first surface 414a of the switch element 402 is visible on the front surface 401 of the card 400, whereas in the credit card configuration shown in FIG. 4c, a second surface 414b is visible on a front surface 401 of the card 400. The first surface 414a displays an indicator "Debit" and the second surface 414b displays an indicator "Credit" to inform the user of the current state of the card.

Turning the switch element 402 causes the card 400 to switch between states in which it is operable to act as either a debit card or a credit card. This switching can be achieved by a reed switch arrangement 414a, 414b, 416, wherein a magnetic element 416 is located on one edge of the switch portion 402, a first switch element 414a is located on a part of the card portion 403 facing the switch element and a second switch element 414b is located on another part of the card portion 403 facing the switch portion 402. The magnetic element 416 is thus in the proximity of, and thereby activates, the first switch element 414a in the first configuration and is in the proximity of, and thereby activates, the second switch element 414b in the second configuration.

In some arrangements, mechanical micro-switches are used in addition to or instead of a reed switch arrangement.

Although not shown, a mechanical locking arrangement, such as a sliding segment of a locking slide, operating at 90 degrees to the axis of rotation, a swing arm or quadrant could be used to lock the switch portion 402 in a configuration.

Many other types of movable portion can be used in accordance with embodiments of the present invention. FIG. 5a to FIG. 6b provide further examples; although the processor card arrangements shown in simple diagrams of FIG. 5a to FIG. 6b do not show components such as an antenna, display or input means described in relation to other drawings herein, it is to be understood that such components are typically included in such arrangements.

Figure 5A:
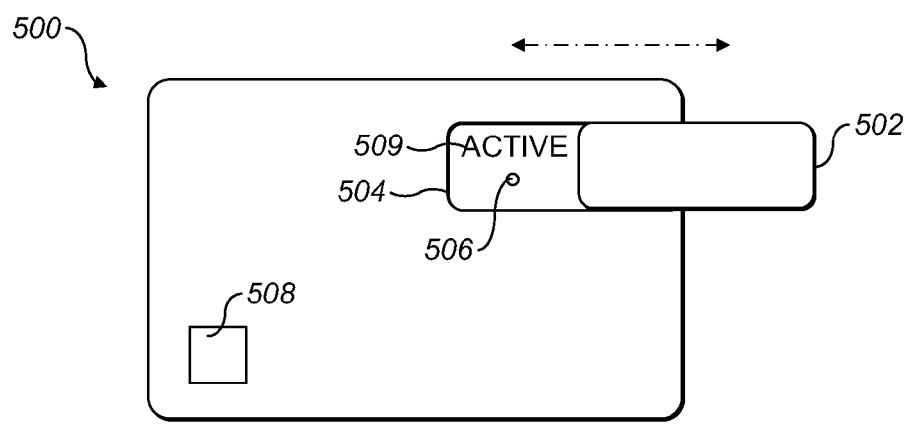
FIG. 5a is a simple schematic diagram of a seventh processor card arrangement in a first configuration according to an embodiment of the present invention.

FIG. 5a shows a processor card arrangement 500 comprising a processor chip 508 and a sliding portion 502. In an inactive configuration, the sliding portion 502 is located in a concave part 504 of the processor card arrangement 500. In this configuration, the card is in an inactive state. In an active configuration, the sliding portion 502 is displaced laterally in a plane of the card surface so that it protrudes out from an edge of the processor card arrangement 504. In the active configuration, the card is in an active state, as is indicated by the indication "active" on a surface 507 of the concave part 504 which is exposed in the active configuration, but not in the inactive configuration. A sensor 506, which may comprise, for example, a reed switch or a micro-switch located in the concave part 504 provides means for switching between the active state and the inactive state.

Figure 5B:
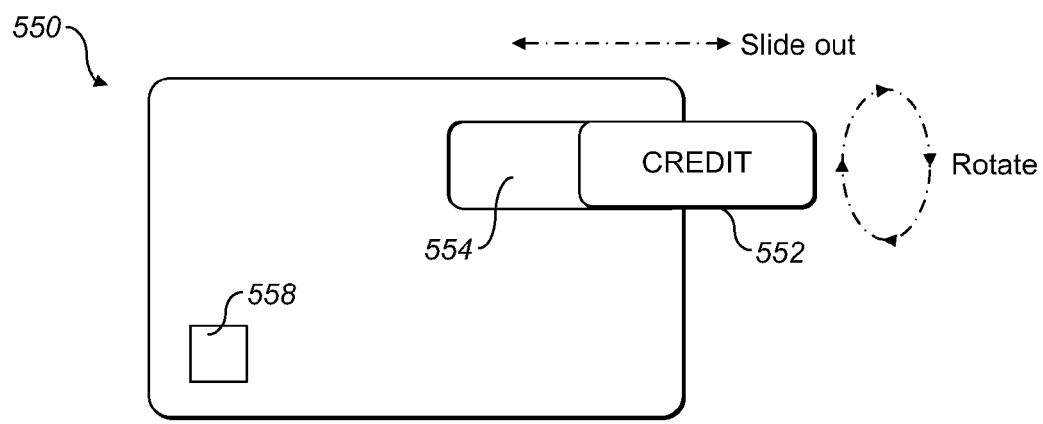
FIG. 5b is a simple schematic diagram of an eighth processor card arrangement according to an embodiment of the present invention.

FIG. 5b shows a variation of the arrangement 500 of FIG. 5a, in which a sliding portion 552 can be completely removed from a concave part 554 of the arrangement 550, reversed and replaced, so that different surfaces of the sliding portion are exposed in different configurations. This may allow the card arrangement 550 to be arranged in one state in which it can function as a credit card, and another state in which it can function as a debit card, for example.

Figure 6A:
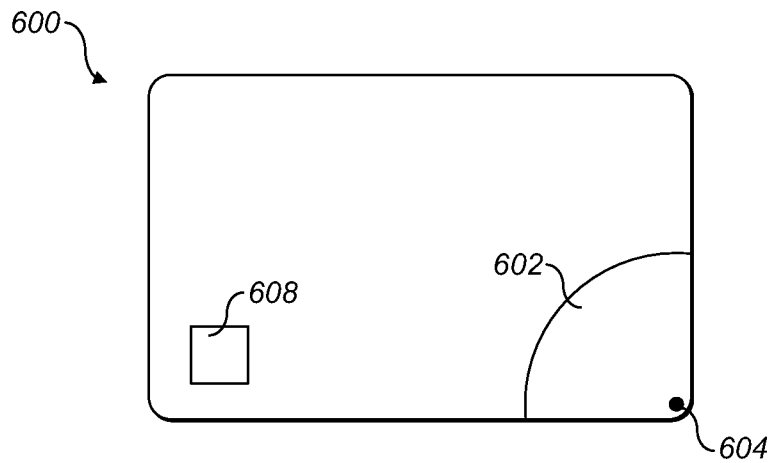
FIG. 6a is a simple schematic diagram of a ninth processor card arrangement in a first configuration according to an embodiment of the present invention.

FIG. 6a is a simple diagram of a processor card arrangement 600 comprising a processor chip 608 and a swivel portion 602 connected to a corner of the processor card arrangement 200 by a swivel hinge. In the configuration shown in FIG. 6a the swivel portion overlaps with the rest of the processor card arrangement 600, and the arrangement 600 is in an inactive state.

Figure 6B:
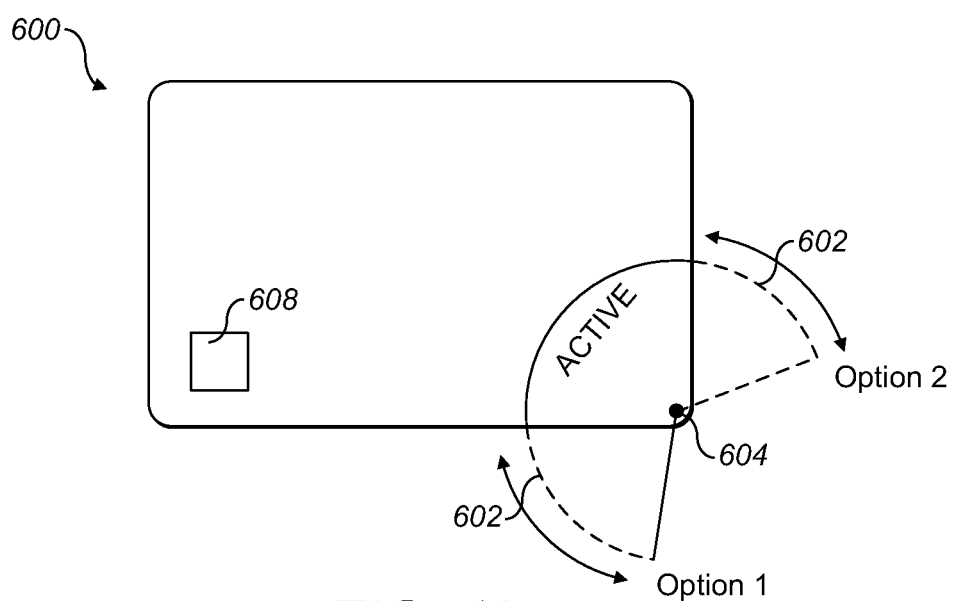
FIG. 6b is a simple schematic diagram of the ninth processor card showing a rotating portion being rotated.

As shown in FIG. 6b, the swivel portion can be rotated about the swivel hinge 604 to switch the card into an active configuration. The rotation can be either clockwise or anti-clockwise, with a state of the card varying depending on the direction of rotation; for example, the card may be switched into an active state in which it is capable of acting as a credit card when rotated clockwise, and switched into an active state in which it is capable of acting as a debit card when rotated anticlockwise, for example. The switching may be implemented by a rotary switch in the swivel hinge 604.

Figure 7:
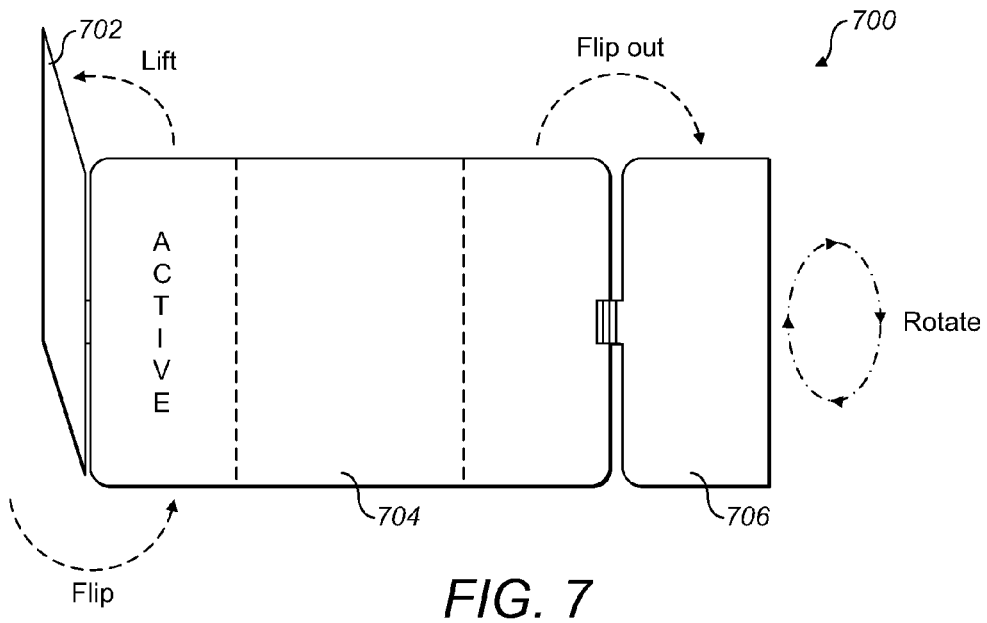
FIG. 7 shows an embodiment of the present invention comprising three portions.

In some embodiments of the present invention, a processor card comprises more than two portions. For example, FIG. 7 shows a processor card arrangement 700 comprising a first portion 702, a second portion 704 and a third portion 706. In one configuration, the first portion overlaps a part of the second portion, and can be lifted and flipped-over to an opposing face of the second portion to switch to a further configuration, similar to the arrangement 100 described with reference to FIG. 1a to FIG. 1e. The third portion 706 can be lifted, rotated and replaced, similar to the arrangement described with reference to FIG. 3e. In some embodiments of the present invention, other combinations of portions are used.

FIG. 8a to FIG. 8d show a further processor card arrangement 800 comprising a processor card 801, and an attaching portion 802. The processor card 801 comprises a processor chip 814 and has a card contact 812 and a card number 808 on a first surface 803a. The attaching portion 802 comprises a battery 806, a display light 804, an antenna 816 and an attaching portion contact 810. The display light could comprise a light emitting diode (LED).

Figure 8A:
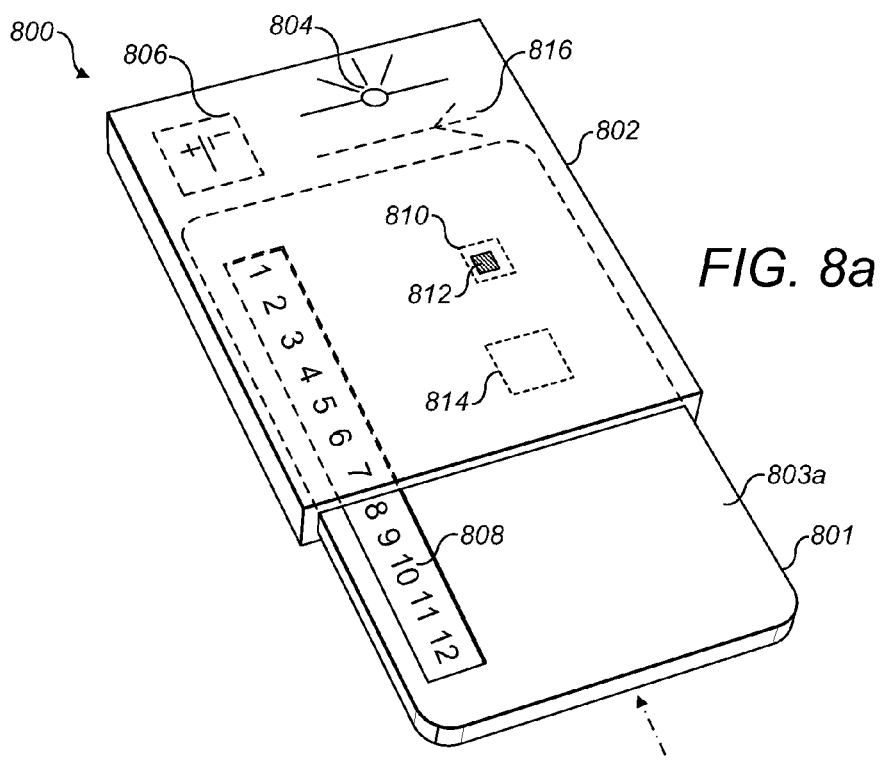
FIG. 8a is a schematic diagram of a tenth processor card arrangement in a first configuration according to an embodiment of the present invention in which a processor card is inserted into an attaching portion.

FIG. 8a shows the arrangement 800 in an active configuration in which the processor card 801 is inserted into the attaching portion 802. In this configuration, the card contact 812 is in contact with the attaching portion contact 810; this electrically connects the attaching portion 802 and the processor card 801, so that information stored on the card, for example in the processor chip 814 can be accessed and transmitted to a terminal via the antenna 816 of the attaching portion. That the arrangement 800 is in an active state is indicated by the display light 804, which may be lit or flashing when in this configuration.

Figure 8B:
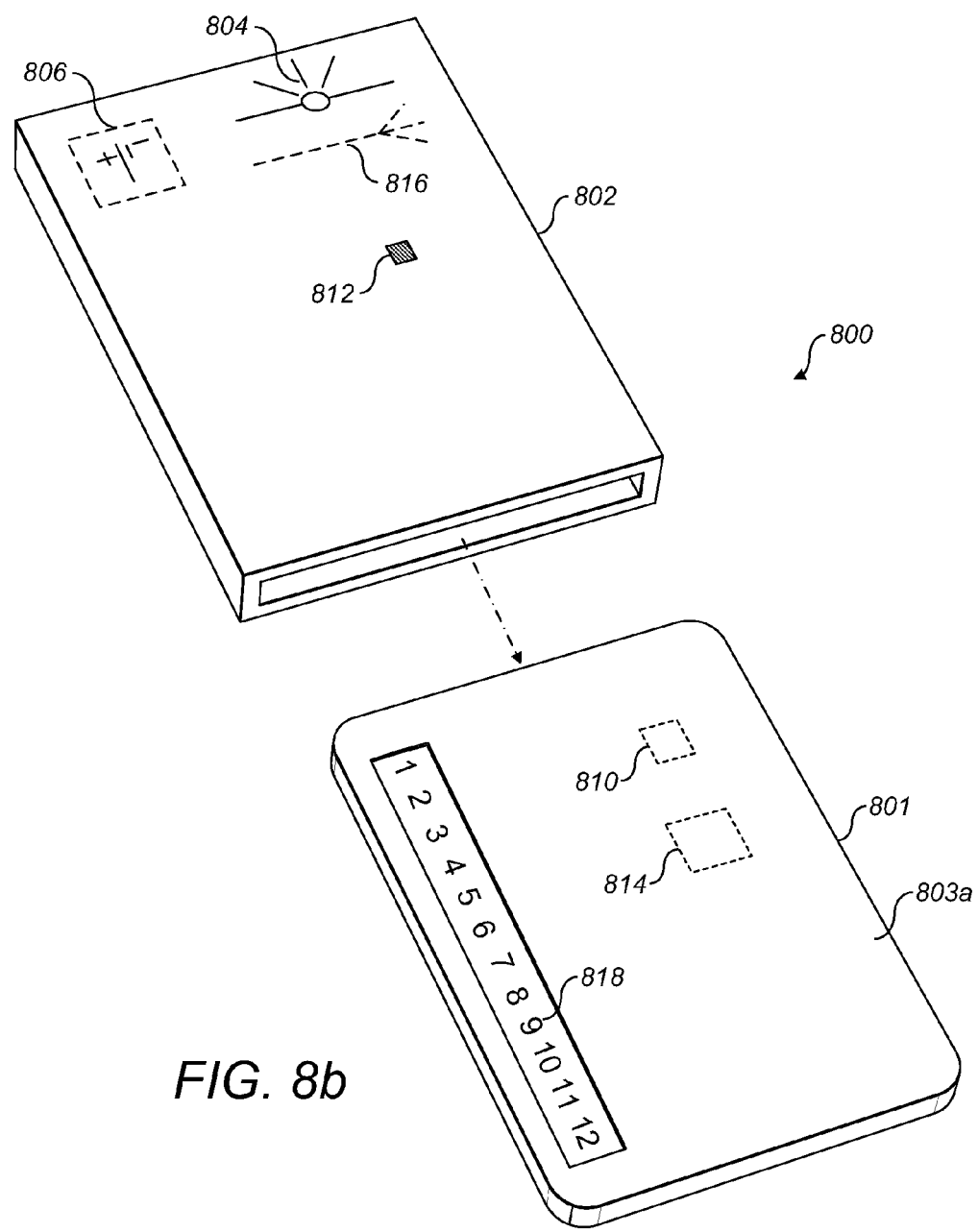
FIG. 8b is a schematic diagram of the tenth processor card arrangement in which processor card is separated from an attaching portion.
Figure 8C:
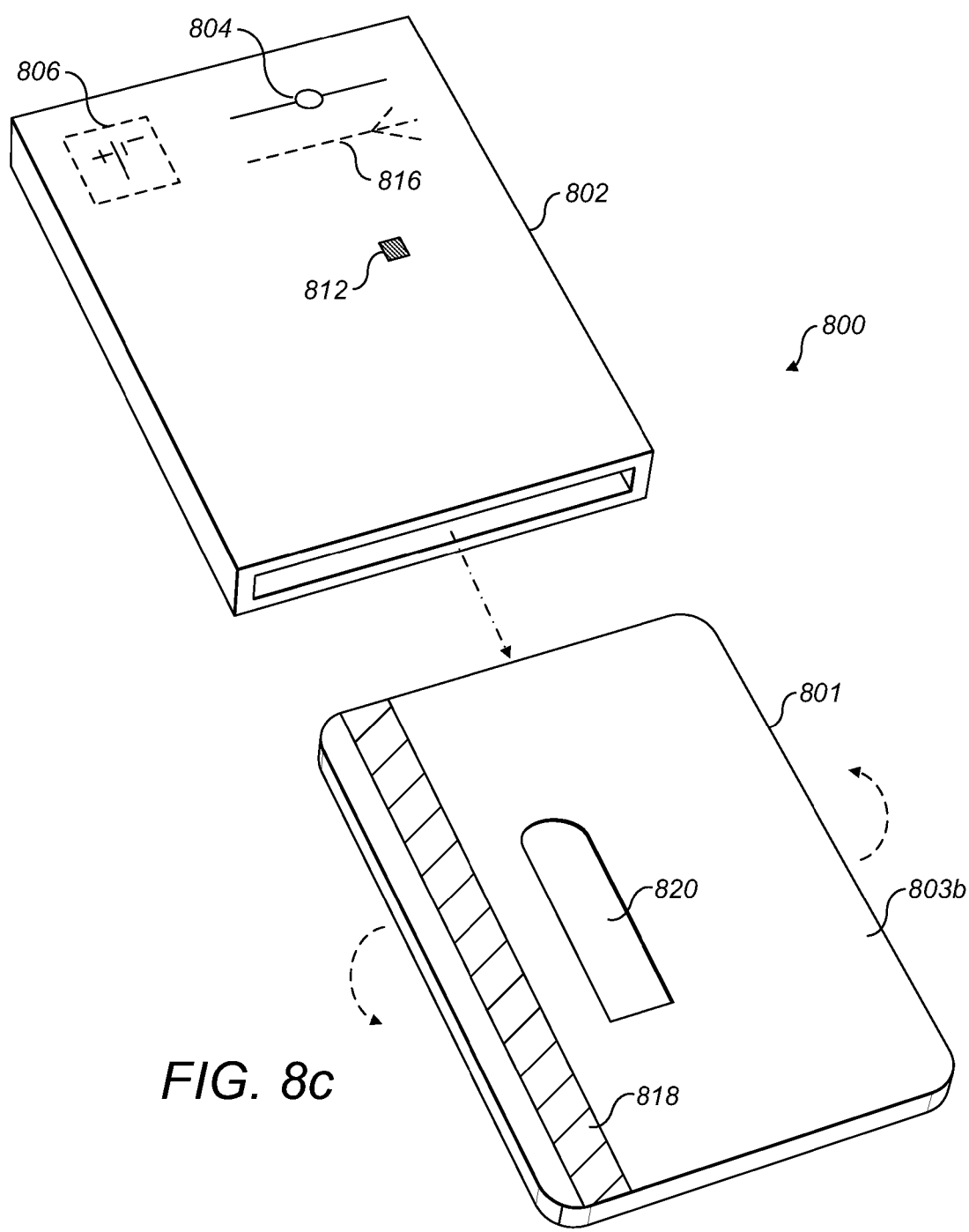
FIG. 8c is a schematic diagram of the tenth processor card arrangement in which the direction of face of the processor card is reversed.
Figure 8D:
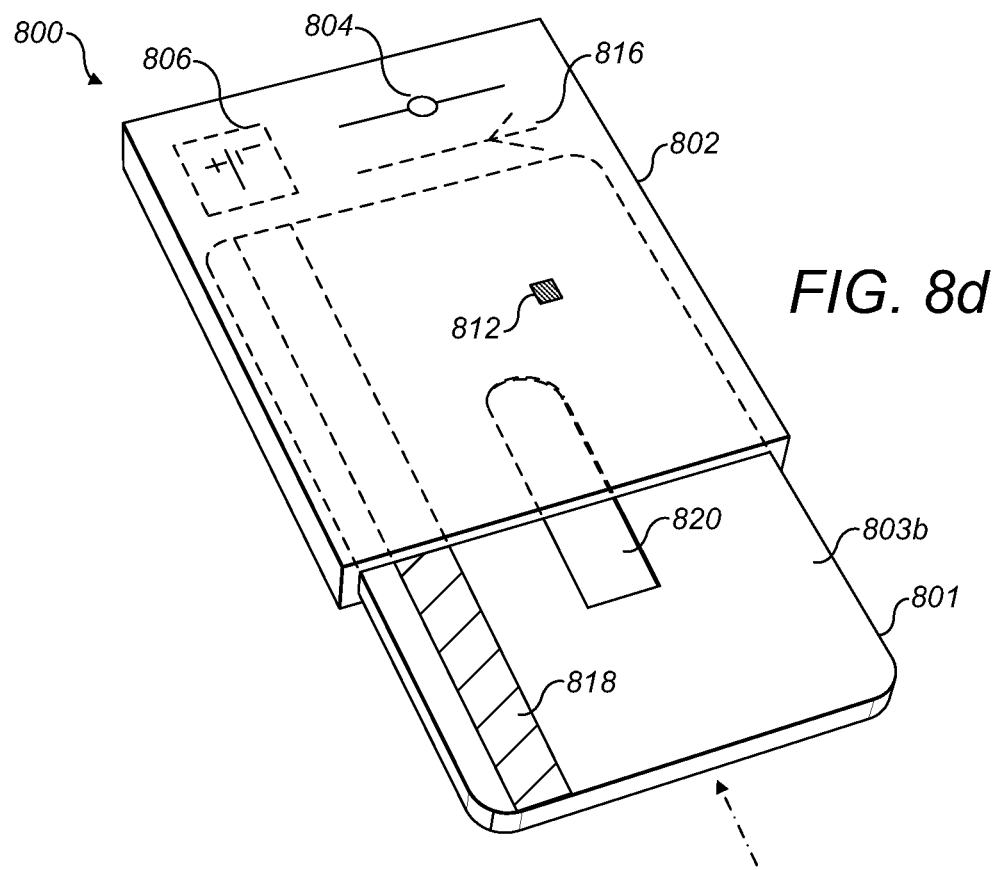
FIG. 8d is a schematic diagram of the tenth processor card arrangement in a second configuration in which the direction of face of the processor card reversed with respect to the first configuration.

In order to change the configuration of the arrangement 800 to an inactive configuration, the card 801 is removed from the attaching portion 802, as shown in FIG. 8b, flipped over, as shown in FIG. 8c, and then reinserted into the attaching portion 802, as shown in FIG. 8d. FIG. 8c and FIG. 8d show a reverse surface 803b of the processor card 801, which comprises a magnetic strip 818 and an area for a signature 820. However, since the reverse surface 803b does not have a contact, no electrical connection between the card 801 and the attaching portion 801 is formed, and no communication between the arrangement 800 and a remote terminal is possible. In this inactive configuration, the display light 804 is not lit or flashing.

Figure 9:
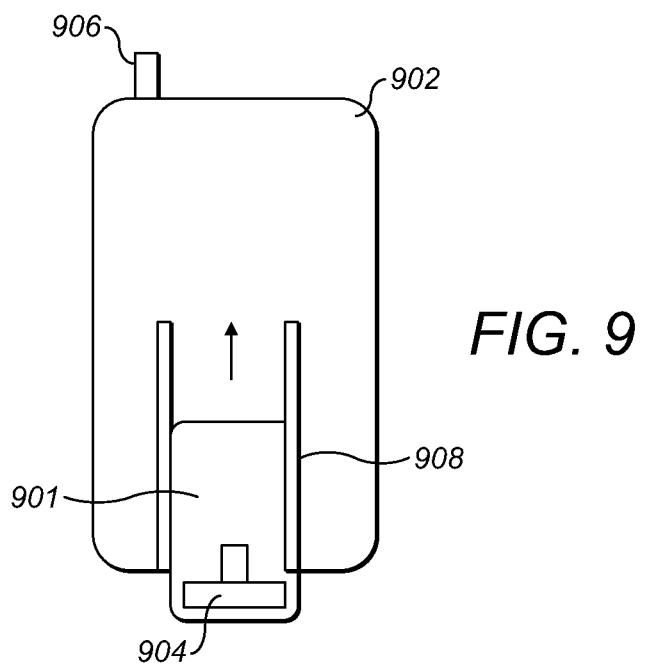
FIG. 9 is a schematic diagram of a processor card arrangement according to an embodiment of the present invention being used in conjunction with a mobile communications device.

Processor card arrangements according to embodiments of the present invention may be used in conjunction with a mobile communications device capable of communicating of communicating with a terminal such as a mobile telephone or Personal Digital Assistant (PDA), which accesses information on the card arrangement and thereby communicates with a terminal. An example in which a processor card arrangement 901 is used in conjunction with a mobile telephone 502 is now described with reference to FIG. 9. The mobile telephone 902 comprises an antenna 906, using which it communicates with a terminal.

In this example, the processor card arrangement 901 is inserted between rails into a card holder 908. The mobile telephone 902 is capable of reading information on the card arrangement 901 using, for example, an appropriate contact with a processor chip (not shown) of the card arrangement 901, a contactless inductive connection between the card arrangement 901 and the mobile phone 902, or a capacitive link between the card arrangement 901 and the mobile telephone 902.

The processor card 901 arrangement comprises a "T" shaped portion 904 which may be lifted, rotated and replaced, similar to the "T" shaped portion 252 of FIG. 2f, allowing the processor card arrangement 901 to be switched between states; such states may comprise an active state, an inactive state, a state in which the card functions as a credit card and/or a state in which the card functions a debit card. In some cases, a function may vary according to into which end of the card holder it is inserted.

The above embodiments are to be understood as illustrative examples of the invention. Further embodiments of the invention are envisaged. For example, in some arrangements, repeat manipulation of a single card element or portion may cause sequential changes of state; for example, repeat lifting and replacing of a card portion within a predetermined time limit may cause a state of a card arrangement to progress through a sequence of different states.

Further, although in the arrangements described above single reed switch arrangements comprising a single magnetic element and a single switch element are used, in many cases such arrangements are used in pairs; this helps to avoid external magnetic fields causing unintended operation.

Additionally, the sensors used could be micro-accelerometers, where the rate of movement of one component in relation to another can be used to cause the required state change e.g. slow opening of the folding element may provide a first state; more rapid movement may be used to change the state to another state.

In some of the above embodiments, a processor card arrangement was described which was capable of switching between functioning as a debit card and functioning as a credit card. However, in some arrangements, the switching could instead be between different accounts, for example a first credit card account and a second credit card account associated with the user. Alternatively, or additionally, in some arrangements, there could be configurations in which the card arrangement is capable of being used as a stored value card e.g. for making payment for a specific service or services, for example transport services.

In some cases, particularly where the card arrangement is capable of acting as more than one type of transaction card, the card arrangement may comprise more than one processor chip.

The input means described in relation to the above embodiments was a keypad. However, in some cases, a different input means, such as a mouse or touchpad could additionally or alternatively used. Further, although in the embodiments described above, the processor card arrangement comprised a power source, in some cases this may not be necessary; for example, the card could be powered by the RFID signal form a remote reader.

It will be appreciated by those of normal skill in the art that, in the embodiments of the invention described above, information may be read from and written to the processor chip via at least one array of contact pads disposed on a face (or faces) of the processor card; in addition to or instead of via wireless means. Moreover, it will be appreciated that the location of the array of contact pads may conform to any of ISO 7810, extension standards of ISO 7810 (for example ISO 7816) or replacement standards thereof. In embodiments in which there is more than one processor chip, there may be more than one array of respective contact pads (e.g. one for each chip). Indeed, even given only one processor chip, there may be more than one array of contact pads for that chip, to accommodate 'contact' transactions when the processor card is in more than one of its configurations. For example, a processor chip may, in effect, be sandwiched between two arrays of contact pads—one on each surface of a portion of the processor card—such that data may be read from or written to the processor chip using either array of contact pads. In such an arrangement, for example, only one array of contact pads might be accessible when the processor card arrangement is in a first configuration and the only the other array of contact pads might be accessible when the processor card arrangement is in a second configuration. In any event, desirably, each set of contact pads would typically be located in compliance with any of the aforementioned standards.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A processor card comprising a first portion and a second portion capable of being moved relative to one another between a first configuration and a second configuration resulting in the processor card switching between a first state and a second state, wherein:
   when in said first state, the processor card is operable to perform at least one function;
   when in said second state, the processor card it is not operable to perform said at least one function;
   the processor card comprises a first array of contact pads on a first face of the processor card, and a second array of contact pads on a second face of the processor card, the first array of contact pads being configured to electronically connect the processor card to an interface structure of a card reading terminal when the processor card is in the first configuration, and the second array of contact pads being configured to electronically connect the processor card to the same interface structure of the card reading terminal when the processor card is in the second configuration; and wherein the dimensions of said processor card are substantially the same when in the first configuration and when in the second configuration.

2. A processor card according to claim 1, wherein said at least one function comprises communicating with a remote device.

3. A processor card according to claim 1, wherein the surface area of the processor card is substantially the same when in said first configuration as when in said second configuration.

4. A processor card according to claim 1, wherein moving the processor card between a first configuration and a second configuration comprises at least one of one of the following actions: lifting at least one of said first portion and second portion; sliding at least one of said first portion and second portion; rotating at least one of said first portion and second portion.

5. A processor card according to claim 1, wherein each of said first portion and said second portion comprises a laminar portion arranged so that, in said second configuration, a first face of said first portion opposes a first face of said second portion and said first portion overlaps said second portion.

6. A processor card according to claim 1, wherein movement between said first configuration and said second configuration comprises a lifting action and a rotating action, such that, in said first configuration, a first face of said first portion is exposed, and, in said second configuration, a second face of said first portion is exposed.

7. A processor card according to claim 1, wherein movement from said second configuration to said first configuration exposes a first display element.

8. A processor card according to claim 1, wherein movement from said first configuration to said second configuration exposes a first input means.

9. A processor card according to claim 8, wherein said first input means comprises a key pad.

10. A processor card according to claim 1, wherein said processor card is lockable in at least one of said first configuration and said second configuration.

11. A processor card according to claim 1, wherein said processor card comprises a third portion which is capable of being moved with respect to at least one of said first portion and said second portion.

12. A processor card according to claim 1, wherein said processor card comprises a transaction card.

13. A processor card according to claim 12, wherein said processor card is operable for use in a transaction involving a first user account when in said first state, and said is operable for use in a transaction involving a second user account when in said second state.

14. A processor card according to claim 12, wherein said processor card is operable to perform a function of a first type of transaction card when in said first state, and said processor card is operable to perform a function of a second type of transaction card when in said second state.

15. A processor card according to claim 1, wherein the dimensions and position of at least one of said first and second array of contact pads comply with ISO 7810.

16. A processor card according to claim 1, wherein the dimensions and position of at least one of said first and second array of contact pads comply with ISO 7816.

17. A processor can according to claim wherein the dimensions and positions of each of said first and second arrays of contact pads complies with ISO 7810 and/or 7816.

18. A processor card comprising a first portion and a second portion capable of being moved relative to one another between a first configuration and a second configuration resulting in the processor card switching between a first state and a second state, said first portion and said second portion each comprising a laminar portion arranged so that, in said second configuration, a first face of said first portion opposes a first face of said second portion and said first portion overlaps said second portion, wherein:
   when in said first state, the processor card is operable to perform at least one function;
   when in said second state, the processor card it is not operable to perform said at least one function;
   the processor card comprises a first array of contact pads on a first face of the processor card, and a second array of contact pads on a second face of the processor card, the first array of contact pads being configured to electronically connect the processor card to an interface structure of a card reading terminal when the processor card is in the first configuration, and the second array of contact pads being configured to electronically connect the processor card to the same interface structure of the card reading terminal when the processor card is in the second configuration; and wherein the dimensions of said processor card are substantially the same when in the first configuration and when in the second configuration.

19. A processor card comprising a first portion and a second portion capable of movement relative to one another between a first configuration and a second configuration resulting in the processor card switching between a first state and a second state, said movement comprising a lifting action and a rotating action, such that, in said first configuration, a first face of said first portion is exposed, and, in said second configuration, a second face of said first portion is exposed, wherein:

when in said first state, the processor card is operable to perform at least one function;

when in said second state, the processor card it is not operable to perform said at least one function;

the processor card comprises a first array of contact pads on a first face of the processor card, and a second array of contact pads on a second face of the processor card, the first array of contact pads being configured to electronically connect the processor card to an interface structure of a card reading terminal when the processor card is in the first configuration, and the second array of contact pads being configured to electronically connect the processor card to the same interface structure of the card reading terminal when the processor card is in the second configuration; and wherein the dimensions of said processor card are substantially the same when in the first configuration and when in the second configuration.

20. A processor card comprising a first portion and a second portion capable of being moved relative to one another between a first configuration and a second configuration resulting in the processor card switching between a first state and a second state, wherein movement from said second configuration to said first configuration exposes a first display element, and wherein:

when in said first state, the processor card is operable to perform at least one function;

when in said second state, the processor card it is not operable to perform said at least one function;

the processor card comprises a first array of contact pads on a first face of the processor card, and a second array of contact pads on a second face of the processor card, the first array of contact pads being configured to electronically connect the processor card to an interface structure of a card reading terminal when the processor card is in the first configuration, and the second array of contact pads being configured to electronically connect the processor card to the same interface structure of the card reading terminal when the processor card is in the second configuration; and wherein the dimensions of said processor card are substantially the same when in the first configuration and when in the second configuration.

21. A processor card comprising a first portion and a second portion capable of being moved relative to one another between a first configuration and a second configuration resulting in the processor card switching between a first state and a second state, wherein movement from said first configuration to said second configuration exposes a first input means comprising a key pad, and wherein:

when in said first state, the processor card is operable to perform at least one function;

when in said second state, the processor card it is not operable to perform said at least one function;

the processor card comprises a first array of contact pads on a first face of the processor card, and a second array of contact pads on a second face of the processor card, the first array of contact pads being configured to electronically connect the processor card to an interface structure of a card reading terminal when the processor card is in the first configuration, and the second array of contact pads being configured to electronically connect the processor card to the same interface structure of the card reading terminal when the processor card is in the second configuration; and wherein the dimensions of said processor card are substantially the same when in the first configuration and when in the second configuration.

22. A processor card comprising a first portion and a second portion capable of being moved relative to one another between a first configuration and a second configuration resulting in the processor card switching between a first state and a second state, wherein:

when in said first state, the processor card is operable to perform at least one function;

when in said second state, the processor card it is not operable to perform said at least one function;

the processor card comprises a first array of contact pads on a first face of the processor card, and a second array of contact pads on a second face of the processor card, the first array of contact pads being configured to electronically connect the processor card to an interface structure of a card reading terminal when the processor card is in the first configuration, and the second array of contact pads being configured to electronically connect the processor card to the same interface structure of the card reading terminal when the processor card is in the second configuration; and wherein the dimensions of said processor card are substantially the same when in the first configuration and when in the second configuration, the dimensions and positions of each of said first and second arrays of contact pads complying with ISO 7810 and/or 7816.

* * * * *